United States Patent [19]

Russell

[11] Patent Number: 4,858,056
[45] Date of Patent: Aug. 15, 1989

[54] MOLDED CASE CIRCUIT BREAKER ACTUATOR-ACCESSORY MODULE

[75] Inventor: Ronald R. Russell, Plainville, Conn.

[73] Assignee: General Electric Company, New York, N.Y.

[21] Appl. No.: 202,651

[22] Filed: Jun. 6, 1988

[51] Int. Cl.[4] .............................................. H02H 3/08
[52] U.S. Cl. ...................................... 361/93; 361/42; 361/96
[58] Field of Search ................................... 361/42–50, 361/93, 96, 87, 94; 335/18, 30

[56] References Cited

U.S. PATENT DOCUMENTS

| | | | |
|---|---|---|---|
| 4,121,269 | 10/1978 | Hobson, Jr. | 361/44 |
| 4,208,690 | 6/1980 | McGinnis et al. | 361/48 |
| 4,209,818 | 6/1980 | Zylstra et al. | 361/96 |
| 4,246,623 | 1/1981 | Sun | 361/94 |
| 4,305,108 | 12/1981 | Udren | 361/96 |
| 4,589,052 | 5/1986 | Dougherty | 361/94 |
| 4,622,444 | 11/1986 | Kandatsu et al. | 200/303 |
| 4,631,622 | 12/1986 | Howell | 361/45 |
| 4,641,117 | 2/1987 | Willard | 335/7 |
| 4,652,975 | 3/1987 | Scott | 361/404 |
| 4,679,019 | 7/1987 | Todaro et al. | 335/172 |
| 4,700,161 | 10/1987 | Todaro et al. | 335/172 |
| 4,706,054 | 11/1987 | Hampton et al. | 335/203 |
| 4,728,914 | 3/1988 | Morris et al. | 335/6 |

FOREIGN PATENT DOCUMENTS 1394456 5/1975 United Kingdom ................... 361/48

OTHER PUBLICATIONS

Ser. No. 133,867 entitled "Molded Case Circuit Breaker Shunt Trip Unit", Morris et al., filed 12/16/87.
Ser. No. 133,868 entitled "Molded Case Circuit Breaker Auxiliary Switch Unit", Yu et al., filed 12/16/87.
Ser. No. 133,869 entitled "Molded Case Circuit Breaker Multiple Accessory Unit", Russell et al., filed 12/16/87.
Ser. No. 163,589 entitled "Molded Case Circuit Breaker Actuator-Accessory Unit", Castonguay et al., filed 3/3/88.
Ser. No. 176,589 entitled "Molded Case Circuit Breaker Actuator-Accessory Module", Russell, filed 4/1/88.
Ser. No. 185,723 entitled "Molded Case Circuit Breaker Actuator-Accessory Module", Russell, filed 4/25/88.

Primary Examiner—A. D. Pellinen
Assistant Examiner—A. Jonathan Wysock
Attorney, Agent, or Firm—Richard A. Menelly; Walter C. Bernkopf; Fred Jacob

[57] ABSTRACT

An integrated protection unit is a circuit breaker which includes basic overcurrent protection facility along with selective electrical accessories. A molded plastic accessory access cover secured to the integrated protection unit cover protects the accessory components contained within the integrated protection unit cover from the environment. A combined overcurrent trip actuator and multiple accessory module is either field-installed or factory-installed within the integrated protection unit. A separate actuator-accessory module is selected for different combinations of accessory functions. One such actuator-accessory module provides ground fault protection along with remote trip facility.

51 Claims, 4 Drawing Sheets

MOLDED CASE CIRCUIT BREAKER ACTUATOR-ACCESSORY MODULE

BACKGROUND OF THE INVENTION

The trend in the circuit protection industry is currently toward complete circuit protection which is accomplished by the addition of supplemental protection apparatus to standard overcurrent protective devices, such as molded case circuit breakers. U.S. Pat. No. 4,622,444 entitled "Circuit Breaker Housing and Attachment Box" describes an accessory that can be field-in-stalled within a circuit breaker without interfering with the integrity of the circuit breaker internal components. This is accomplished by mounting the accessories within a recess formed in the circuit breaker enclosure cover.

An electronic trip actuator which is mounted within the circuit breaker enclosure is described within U.S. Pat. No. 4,679,019 entitled "Trip Actuator for Molded Case Circuit Breakers". The circuit breaker actuator responds to trip signals generated by an electronic trip unit completely contained within a semi-conductor chip such as that described within U.S. Pat. No. 4,589,052. The development of a combined trip actuator for both overcurrent protection as well as accessory function is found within U.S. Pat. No. 4,700,161 entitled "Combined Trip Unit and Accessory Module for Electronic Trip Circuit Breakers". The aforementioned U.S. Patents which represent the advanced state of the art of circuit protection devices are incorporated herein for reference purposes.

A shunt trip accessory unit allows the circuit breaker operating mechanism to be articulated from a remote location to separate the circuit breaker contacts, usually to perform a tripping function for electrical system control and protection. One such shunt trip accessory unit is described within U.S. patent application Ser. No. 133,867 filed Dec. 16, 1987 entitled "Molded Case Circuit Breaker Shunt Trip Unit". An auxiliary switch accessory unit allows an operator to determine the "ON" or "OFF" conditions of a molded case circuit breaker contacts at a remote location by means of an audible alarm or visible display. One such auxiliary switch unit is described within U.S. patent application Ser. No. 133,868 filed Dec. 16, 1987 entitled "Molded Case Circuit Breaker Auxiliary Switch Unit". Both of the aforementioned U.S. Patent Applications are incorporated herein for purposes of reference.

A more recent example of a combined overcurrent trip actuator and multiple accessory unit is described within U.S. patent application Ser. No. 133,869 filed Dec. 16, 1987 entitled "Molded Case Circuit Breaker Multiple Accessory Unit" which combined overcurrent trip actuator and multiple accessory unit requires a separate mounting recess within the circuit breaker cover to house the printed wire board that carries the accessory control circuit. U.S. patent application Ser. No. 163,589 entitled "Molded Case Circuit Breaker Actuator-Accessory Unit" describes one such combined overcurrent trip actuator and multiple accessory unit wherein the printed wire board and actuator-accessory unit are both contained within the same mounting recess within the circuit breaker cover. U.S. patent application Ser. No. 176,589 describes an actuator-accessory module wherein the electromagnetic actuator and electronic control circuits are self-contained within a single unitary module. U.S. patent application Ser. No. 185,723 entitled "Molded Case Circuit Breaker Actuator-Accessory Module" describes an arrangement whereby a separate actuator-accessory module is selected for different combinations of accessory functions. All of the aforementioned U.S. Patent Applications are incorporated herein for reference purposes.

SUMMARY OF THE INVENTION

An integrated protection module which includes overcurrent protection along with auxiliary accessory function within a common enclosure contains an accessory cover for access to the selected accessory modules to allow field installation of the accessory modules within an integrated protection unit. One combined actuator-accessory module provides overcurrent protection along with shunt trip function and ground fault protection. The electromagnetic actuator includes a first coil for overcurrent operation and a second coil for shunt trip operation. The overcurrent electronic control is provided by the electronic trip circuit contained within the circuit breaker portion of the integrated protection unit or by means of a thermal-magnetic trip unit whereas the shunt trip control and ground fault protection is provided by an electronic circuit contained within the accessory module.

DESCRIPTION OF THE PREFERRED EMBODIMENT

Figure 1:
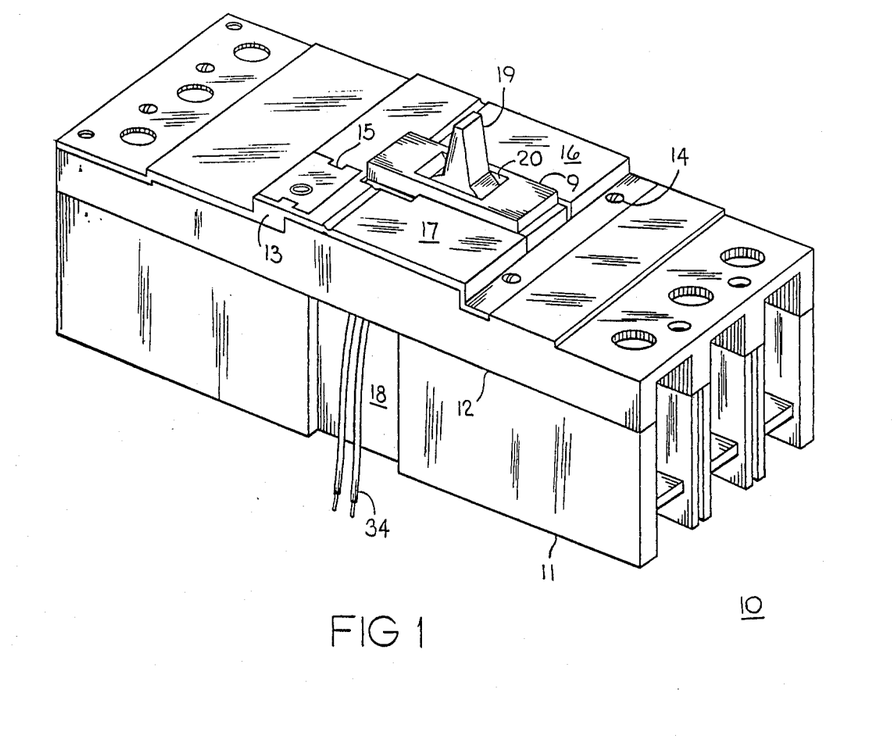
FIG. 1 is a top perspective view of an integrated molded case circuit breaker containing an overcurrent, shunt trip and ground fault actuator-accessory module according to the invention.

An integrated circuit breaker 10 consisting of a molded plastic case 11 with a molded plastic cover 12 is shown in FIG. 1 with the accessory cover 13 attached to the circuit breaker cover by means of screws 14. The case includes a wiring slot 18 formed therein for allowing external connection with a remote switch by means of conductors 34. The circuit breaker operating handle 19 extends up from an access slot 20 formed in the cover escutcheon 9. A rating plug 15 such as described in U.S. Pat. No. 4,728,914 entitled "Rating Plug Enclosure for Molded Case Circuit Breakers", which Patent is incorporated herein for reference purposes is shown assembled within the accessory cover. A pair of accessory doors 16, 17 are formed in the accessory cover for providing access to the overcurrent and shunt trip actuator and accessory module 31, hereafter "actuator-accessory module" contained within the recess 40, shown in Fig. 2. Still referring to FIG. 2, the rating plug 15 is fitted within a recess 23 formed in the accessory cover 13 and the accessory cover is fastened to the circuit breaker cover by means of screws 14, thru-holes 24 and threaded openings 25. Access to the rating plug interior for calibration purposes is made by means of the rating plug access hole 21.

Figure 2:
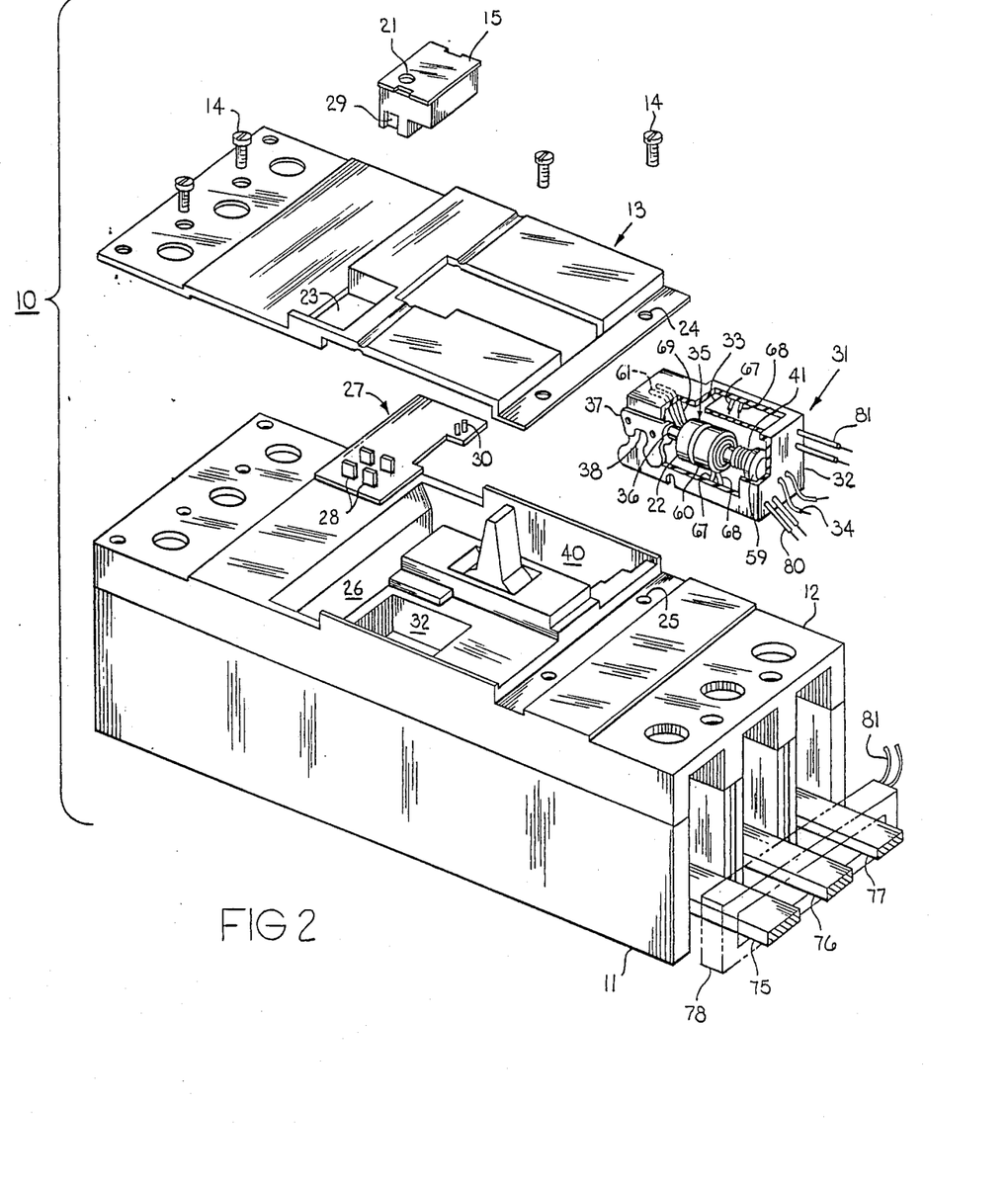
FIG. 2 is an exploded top perspective view of the integrated circuit breaker of FIG. 1 prior to assembly of the overcurrent, shunt trip and ground fault actuator-accessory module according to the invention.

The trip unit for the integrated circuit breaker 10 is contained within a printed wire board 27 which is positioned in the trip unit recess 26. The rating plug 15 when inserted within the rating plug recess interconnects with the printed wire board by means of pins 28 upstanding from the printed wire board and sockets 29 formed on the bottom of the rating plug. The trip unit in turn electrically connects with the current transformers 47, 48 (Fig. 3) by means described within U.S. Pat. No. 4,652,975 entitled "Mounting Arrangement for Circuit Breaker Current Sensing Transformers" which Patent is incorporated herein for reference purposes. When the trip unit printed wire board has been assembled within its recess, the actuator-accessory module 31 is then installed within recess 40. In some applications the printed wire board and rating plug are omitted and a thermal-magnetic trip unit is used for overcurrent protection while the accessory functions are separately provided by the actuator-accessory module per se. One example of one such thermal-magnetic trip unit is found in U.S. Pat. No. 4,706,054. The actuator-accessory module includes a housing 32 within which the dual actuator-accessory coil 35 is enclosed and which further contains a plunger 36 and a plunger spring 41 which projects the plunger in a forward trip position when the dual actuator-accessory coil 35 becomes energized. The actuator-accessory module is similar to the actuator-accessory unit described within aforementioned U.S. patent application Ser. No. 163,589 wherein a trip actuator latch 37 is pivotally attached to the housing 32. A hook 38 formed at one end of the trip actuator latch cooperates with the circuit breaker operating mechanism shown in aforementioned U.S. Pat. No. 4,700,161 in the manner to be described below in greater detail. The operation of the actuator-accessory module is similar to that described within U.S. Pat. Nos. 4,641,117 and 4,679,019 which Patents are incorporated herein for purposes of reference. The dual actuator-accessory coil 35 differs from that described within some of the referenced Patents by including a separate flux shift coil 22 for overcurrent trip operation and a separate shunt trip coil 60 for remote shunt trip operation. A permanent magnet 59 is provided at the end of both coils to hold the plunger 36 against the bias exerted on the plunger by the charged plunger spring 41. A similar combined accessory and trip actuator unit is described within U.S. Pat. No. 4,641,117 entitled "Combined Accessory and Trip Actuator Unit for Electronic Circuit Breakers" which Patent is incorporated herein for purposes of reference. The actuator-accessory module includes a printed wire board 33 which contains the components required for operating the shunt trip coil 60 and is connected with the shunt trip coil by means of a pair of wire conductors 67, 68. A pair of wire conductors 34 connect the actuator-accessory module with an external voltage source and switch for shunt trip operation. The flux shift coil 22 connects with the trip unit 27 by means of a pair of wire conductors 69 attached to the coil and by means of edge connectors 61 arranged within the housing for receiving a pair of pins 30 upstanding on the trip unit 27.

Figure 3:
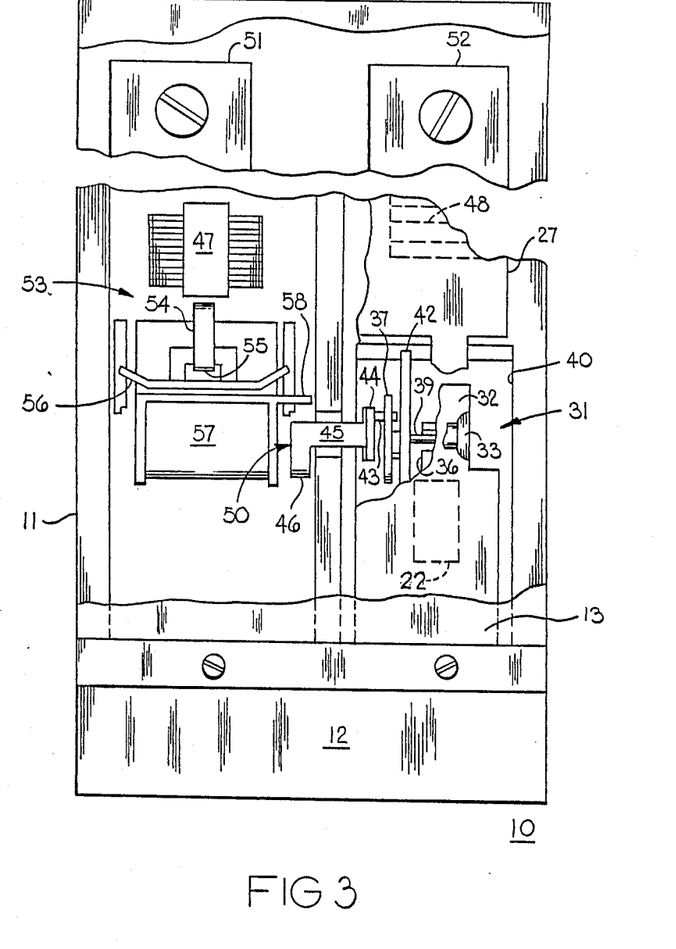
FIG. 3 is a plan view of the integrated molded case circuit breaker with part of the cover removed to show the interaction between the circuit breaker operation mechanism and the combined overcurrent, shunt trip and ground fault actuator-accessory module of Fig. 2.

The actuator-accessory module 31 is depicted in Fig. 3 within the recess 40 in the integrated circuit breaker 10 with part of the actuator-accessory module printed wire board 33, actuator-accessory module housing 32 and accessory cover 13 removed to show the interaction between the actuator-accessory module 31 and the mechanical actuator 50 which sits in the integrated circuit breaker case 11. The integrated circuit breaker operating mechanism shown generally at 53 includes an operating cradle 54 having a hook 55 formed at one end thereof which is retained by means of a primary latch 56. The secondary latch assembly 57 prevents the primary latch from releasing the operating cradle until the secondary latch is displaced. A tab 58 extending from the secondary latch is contacted by the operation of the mechanical actuator 50 to displace the secondary latch and thereby articulate the circuit breaker operating mechanism and separate the circuit breaker contacts in response to a trip command in the following manner. Electric current flow is sensed by the current transformers 47, 48 which are located ahead of load lugs 51, 52 and is acted upon by the trip unit 27 described earlier with reference to FIG. 2. The operating lever 46 sits within the case 11 and connects with the latch support arm 44 in the actuator-accessory module recess 40 by means of a connecting arm 45. The latch pin 43 is retained by the trip actuator latch 37 which is in turn controlled by the position of the trip actuator arm 39 which extends through a side wall 42 of the actuator-accessory module housing 32. The trip actuator arm 39 interfaces with the plunger 36 in the following manner. When the circuit current exceeds a predetermined value, current is applied to the flux shift coil 22 thereby allowing the plunger 36 to be propelled by the urgence of the plunger spring (Fig. 2) to thereby rotate the trip actuator latch 37 in the clockwise direction to release the trip actuator latch 37 from the latch pin 43.

Figure 4:
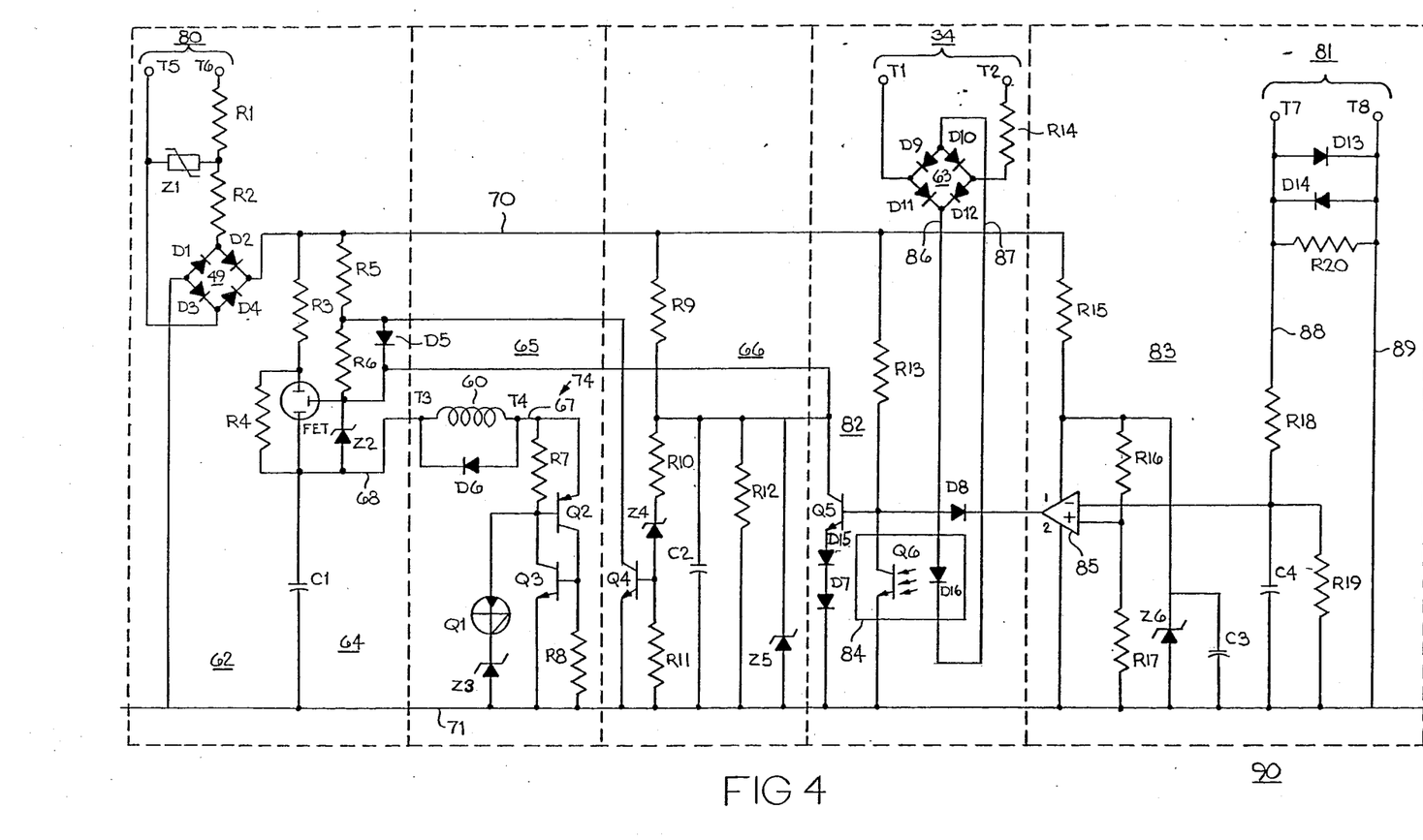
FIG. 4 is a circuit diagram of the shunt trip and ground fault electrical circuit contained within the printed wire board for the overcurrent, shunt trip and ground fault actuator-accessory module of Fig. 2.

The shunt trip function is provided by means of the accessory circuit 90 which includes the input circuit 62, shunt trip circuit 82 and ground fault circuit 83 seen by now referring to both FIG. 2 and FIG. 4. It is noted that an auxiliary switch, such as described within the referenced actuator-accessory Patents is no longer required to interrupt the external voltage signal applied to the shunt trip coil 60. In operation, the remote shunt trip signal voltage is applied to wire conductors 34 and terminals T1, T2 connected to the shunt trip circuit 82 through a bridge rectifier 63 consisting of diodes $D_9$–$D_{12}$ and current limiting resistor $R_{14}$ via conductors 86, 87. External power is supplied to the accessory circuit over external wire conductors 80 and input terminals T5, T6. Transient voltage protection is provided to the input circuit by the combination of the series resistor $R_1$ and zener diode $Z_1$ which are connected across the input terminals. Resistor $R_2$ is a current limiting resistor connected in series with one of the inputs to the diode bridge rectifier 49 consisting of diodes $D_1$–$D_4$. The output of the bridge rectifier connects respectively with the positive and negative rails, 70, 71. A charging circuit 64 consisting essentially of a storage capacitor $C_1$ connects across the positive and negative rails through an FET and resistors $R_3$, $R_4$. The function of the charging circuit is to provide first and second charging rates to the storage capacitor $C_1$. The first charging rate charges the capacitor in less than 10 milliseconds and is provided by the charging circuit consisting of the FET, resistors $R_3$, $R_5$, $R_6$, a signal diode $D_5$ and a zener diode $Z_2$. When voltage is applied over conductors 80 to terminals T5, T6 base drive is applied to transistor $Q_5$ through resistor $R_{13}$ turning on $Q_5$. This clamps the gate of the FET to less than 2 volts and disables the fast charge circuit to the storage capacitor $C_1$ through the FET. To institute a shunt trip operation, a voltage is applied to terminals $T_1$, $T_2$ over conductor 34 through the bridge rectifier 63 including diodes $D_9$–$D_{12}$ and current limited resistor $R_{14}$ onto conductors 86, 87. This executes the photo diode $D_{16}$ within the opto-isolator 84 and turns on the photo transistor $Q_6$ causing the base drive to $Q_5$ to become diverted to the ground rail 71 through diodes $D^7$, $D^{15}$ turning off $Q_5$. The voltage on the gate of the FET exceeds 2 volts thereby charging $C_1$, which becomes completely charged in a period of time less than 10 milliseconds. The voltage across $C_1$ is applied across resistor $R_7$, silicon switch $Q_1$ and zener diode $Z_3$ within the switching circuit 65. When the silicon switch trigger voltage is exceeded, the switch becomes conductive thereby discharging capacitor $C_1$ through the shunt trip coil 60 which is connected between the charging circuit 64 and the electronic switch 74 by means of conductors 67, 68 and terminals T3, T4 described earlier. The shunt trip coil immediately responds by providing an electromagnetic field in opposition to the permanent magnet 59 within the actuator-accessory module 31 of FIG. 2 and allows the plunger 36 to interact with the trip actuator latch 37 and thereby articulate the circuit breaker operating mechanism 53 shown in Fig. 3 and described earlier. The fly-back diode $D_6$ is connected across the shunt trip coil to prevent the occurrence of a transient voltage when the circuit turns off. Once the circuit breaker operating mechanism has responded, and the external voltage signal remains applied to the terminals T1, T2, some means is usually required to insure that the circuit breaker operating mechanism cannot be reset until the remote switch is deactivated. In the prior art arrangement, described earlier, an auxiliary switch interacted with the circuit breaker operating mechanism to interrupt the current applied to the shunt trip coil and to prevent the coil from becoming overheated. The auxiliary switch mechanically interacted with the circuit breaker operating mechanism to insure that the circuit breaker operating mechanism could not be reset without first resetting the auxiliary switch. Since the actuator-accessory module of the instant invention does not include nor require an auxiliary switch, the circuits, per se, insure that the circuit breaker operating mechanism cannot be reset manually while a voltage signal remains impressed across the terminals T1, T2. This is provided by the second capacitor charging circuit through resistor $R_4$ which by-passes the FET in its "OFF" states. The charging current applied to the storage capacitor fully charges the storage capacitor within one to two seconds. The silicon switch responds in the manner described earlier to continuously provide a current pulse to the shunt trip coil 60 every second or so to insure that the circuit breaker operating mechanism remains in a "TRIPPED" condition while the terminals T1, T2 remain energized. The switching function is provided by means of an electronic switch 74 consisting of the silicon switch $Q_1$, zener diode $Z_3$, resistors $R_7$, $R_8$ and transistor switches $Q_2$, $Q_3$. The electronic switch operates in the manner described in the aforementioned U.S. patent application Ser. No. 176,589. The repeated ON and OFF operation of the electronic switch insures that the required trip current is applied to the shunt trip coil 60 without causing the coil to become overheated. Once the electronic switch is turned off, the storage capacitor begins to recharge. With the silicon switch $Q_1$ conductive, current flows through resistor $R_7$ and the emitter-base junction of the transistor switch $Q_2$ causing $Q_2$ to become conductive. Current then flows through resistor $R_8$ and the emitter-base junction of transistor switch $Q_3$ causing $Q_3$ to become conductive. With $Q_3$ conductive, current is shunted away from the silicon switch $Q_1$ turning off the silicon switch and drawing more current through transistor switch $Q_2$ which thereby provides a regenerative latching action that insures that the electronic switch remains on until the discharge current from the storage capacitor decreases to a predetermined value set by the resistor $R_8$. When the trip current through the shunt trip coil drops below the predetermined value, the electronic switch becomes non-conductive and thereby allows the storage capacitor to charge to a voltage sufficient to exceed the trigger voltage to the silicon switch $Q_1$ causing the ON-OFF cycle to repeat itself. The timing circuit 66 for controlling the "ON"-"OFF" states of the FET connects with the positive rail 70 through resistor $R_9$ and operates in the following manner. When terminals T5, T6 are energized, the timing capacitor $C_2$ charges to a voltage determined by zener diode $Z_5$, $R^{12}$ and the capacitor $C_2$. Resistor $R_{11}$, connected across the base-emitter junction of transistor switch $Q_4$, insures that $Q_4$ remains non-conductive. When the timing capacitor $C_2$ exceeds the voltage of $Z_4$, current flows through resistors $R^9$, $R^{10}$, zener diode $Z_4$ and resistor $R_{11}$ to turn on $Q_4$. With $Q_4$ conductive, the gate terminal of the FET is clamped to the negative rail 71 through resistor $R_6$ turning off the FET. This, in turn, initiates the second charging circuit through resistor $R_4$ as described earlier.

Still referring to FIGS. 2 and 4, the ground fault trip function is provided in the following manner. The three-phase currents through line terminal buses 75–77 is sensed within a zero sequence current transformer 78 shown in phantom in FIG. 2 which connects with the actuator-accessory printed wire board 33 over wire conductors 81. Although the zero sequence current transformer is described as arranged around the line terminal buses, this is by way of example only. It is to be clearly understood that the zero sequence current transformer can be arranged around the load terminal buses, if desired. The zero sequence current transformer operates in the manner described within U.S. Pat. No. 4,121,269 entitled "Ground Fault Signal Circuit for Circuit Breaker Trip Unit" to sense the occurrence of a ground fault current appearing within the protected circuit to which the terminal buses are connected. This Patent is incorporated herein for reference purposes. When a ground fault signal is accordingly applied to terminals T7, T8 over the wire conductors 81, the signal appearing on conductors 88, 89 is clamped to approximately one volt by means of the back-to-back diodes $D_{13}$, $D_{14}$ and burden resistor $R_{20}$. An averaging circuit including resistors $R_{18}$, $R_{19}$ and capacitor $C_4$ produces an average ground fault voltage value onto the negative input terminal to the comparator 85. Operating voltage to the comparator is applied to pin 1 which connects with the positive rails 70 through resistor $R_{15}$ and through pin 2 which connects with the negative rail. Power to the comparator is filtered and regulated by the zener diode $Z_6$ and capacitor $C_3$. The reference voltage is supplied to the positive input terminal to the comparator by the midpoint of the voltage divider consisting of resistors $R_{16}$, $R_{17}$. When the ground fault signal exceeds the reference voltage an output signal from the comparator is applied through diode $D_8$ to the base of $Q_5$ thereby clamping the base of $Q_5$ to a low level and causing $Q_5$ to become non-conducting. This will activate the shunt trip coil 60 in the manner described earlier and thereby institute a circuit interruption.

It has thus been shown that an actuator-accessory module containing a flux shift coil for direct operations by means of the circuit breaker trip unit for overcurrent protection and a shunt trip coil connected with a self-contained shunt trip and ground fault circuit for shunt trip operations via a remote voltage source switch and upon the occurrence of a ground fault condition can be provided within a single actuator-accessory module. The shunt trip circuit initiates a continuous series of trip current pulses to the shunt trip coil, without overheating to insure that the circuit breaker operating mechanism remains tripped as long as an external signal voltage is applied to the shunt trip circuit within the actuator-accessory module.

Having thus described my invention, what I claim as new and desire to secure by Letters Patent is:

1. A circuit interrupter comprising:
   a pair of separable contacts;
   an operating mechanism arranged for separating said contacts upon command;
   an overcurrent trip circuit and an electromagnetic overcurrent trip coil, said trip circuit determining overcurrent conditions through said separable contacts and energizing said trip coil to articulate said operating mechanism and separate said contacts when said overcurrent conditions exist for predetermined time periods;
   an accessory coil associated with a plunger and a permanent magnet, said plunger restrained from interacting with said operating mechanism against the bias of a charged spring by attraction to said permanent magnet, said accessory coil being arranged for counteracting said permanent magnet to allow said plunger to interact with said operating mechanism when a current signal is applied to said accessory coil;
   an accessory circuit associated with said accessory coil said accessory circuit including positive and negative voltage rails and connected with said accessory coil for controlling said current signal to said accessory coil, said accessory circuit including a storage capacitor receiving charging current from first and second charging circuits and supplying said current signal to said accessory coil, said accessory circuit further including a first transistor switch for initiating said current signal to said accessory coil; and
   ground fault terminal means arranged for receiving a ground fault signal to operate said first transistor switch to thereby actuate said accessory coil.

2. The circuit interrupter of claim 1 wherein said first transistor switch connects between said first charging circuit and one of said positive and negative rails.

3. The circuit interrupter of claim 1 wherein said first charging circuit includes a FET.

4. The circuit interrupter of claim 2 wherein said FET connects between said positive rail and one side of said accessory coil.

5. The circuit interrupter of claim 2 wherein said second charging circuit includes a linear resistor.

6. The circuit interrupter of claim 1 including comparator means having an output connected to the base of said first transistor switch and one input connected with said ground fault terminal means.

7. The circuit interrupter of claim 6 wherein said comparator means includes a second input connected between a first pair of resistors for providing a reference voltage to said comparator means.

8. The circuit interrupter of claim 5 wherein said linear resistor connects with a source terminal and a drain terminal on said FET.

9. The circuit interrupter of claim 3 including an electronic switch connecting with another side of said accessory coil.

10. The circuit interrupter of claim 6 wherein a silicon switch within said electronic switch connects with said storage capacitor through a zener diode.

11. The circuit interrupter of claim 7 wherein said electronic switch includes a pair of second and third transistor switches wherein a collector on said second transistor switch connects with a base on said third transistor switch.

12. The circuit interrupter of claim 8 including a timing capacitor connected with a gate and a drain terminal on said FET through corresponding current limiting resistors and connected in common with said storage capacitor.

13. The circuit interrupter of claim 9 including a fourth transistor switch having an emitter connected with said storage capacitor and a collector connected with said gate terminal to said FET.

14. The circuit interrupter of claim 10 wherein said first charging circuit charges at a faster rate than said second charging circuit.

15. The circuit interrupter of claim 11 including a second zener diode connected across said timing capacitor through second current limiting resistor.

16. A circuit interrupter comprising:
   a pair of separable contacts;
   an operating mechanism arranged for separating said contacts upon command;
   an overcurrent trip circuit and an electromagnetic overcurrent trip coil, said trip circuit determining overcurrent conditions through said separable contacts and energizing said trip coil to articulate said operating mechanism and separate said contacts when said overcurrent conditions exist for predetermined time periods;
   an accessory coil associated with a plunger and a permanent magnet, said plunger restrained from interacting with said operating mechanism against the bias of a charged spring by attraction to said permanent magnet, said accessory coil being arranged for counteracting said permanent magnet to allow said plunger to interact with said operating mechanism when a current signal is applied to said accessory coil;
   an accessory circuit associated with said accessory coil including positive and negative voltage rails and connected with said accessory coil for controlling said current signal to said accessory coil, said accessory circuit including a storage capacitor receiving charging current from first and second charging circuits and supplying said current signal to said accessory coil, said accessory circuit further including a first transistor switch for initiating said current signal to said accessory coil; and
   shunt trip terminal means arranged for receiving a shunt trip signal to operate said first transistor switch and thereby actuate said accessory coil.

17. The circuit interrupter of claim 16 including an opto-isolator connected between said transistor switch and said shunt trip terminal means to thereby electrically isolate said shunt trip signal from said overcurrent trip circuit.

18. The circuit interrupter of claim 17 wherein said shunt trip terminal means includes a bridge rectifier and a current limiting resistor.

19. The circuit interrupter of claim 18 wherein an LED in said opto-isolator connects with an output from said bridge rectifier and a photo transistor within said opto-isolator connects with a base on said transistor switch.

20. The circuit interrupter of claim 16 wherein said first transistor switch connects between said first charging circuit and one of said positive and negative rails.

21. The circuit interrupter of claim 16 wherein said first charging circuit includes FET.

22. The circuit interrupter of claim 16 wherein said FET connects between said positive rail and one side of said accessory coil.

23. The circuit interrupter of claim 16 wherein said second charging circuit includes a linear resistor.

24. The circuit interrupter of claim 16 including comparator means having an output connected to the base of said first transistor switch and one input connected with said ground fault terminal means.

25. The circuit interrupter of claim 16 wherein said comparator means includes a second input connected between a first pair of resistors for providing a reference voltage to said comparator means.

26. The circuit interrupter of claim 23 wherein said linear resistor connects with a source terminal and a drain terminal on said FET.

27. The circuit interrupter of claim 16 including an electronic switch connecting with another side of said accessory coil.

28. The circuit interrupter of claim 16 wherein a silicon switch within said electronic switch connects with said storage capacitor through a zener diode.

29. The circuit interrupter of claim 16 wherein said electronic switch includes a pair of second and third transistor switches wherein a collector on said second transistor switch connects with a base on said third transistor switch.

30. The circuit interrupter of claim 16 including a timing capacitor connected with a gate and a drain terminal on said FET through corresponding current limiting resistors and connected in common with said storage capacitor.

31. The circuit interrupter of claim 16 including a fourth transistor switch having an emitter connected with said storage capacitor and a collector connected with said gate terminal to said FET.

32. The circuit interrupter of claim 16 wherein said first charging circuit charges at a faster rate than said second charging circuit.

33. The circuit interrupter of claim 16 including a second zener diode connected across said timing capacitor through second current limiting resistor.

34. A circuit interrupter comprising:
a pair of separable contracts;
an operating mechanism arranged for separating said contacts upon command;
an overcurrent trip circuit and an electromagnetic overcurrent trip coil, said trip circuit determining overcurrent conditions through said separable contacts and energizing said trip coil to articulate said operating mechanism and separate said contacts when said overcurrent conditions exist for predetermined time periods;
an accessory coil associated with a plunger and a permanent magnet, said plunger restrained from interacting with said operating mechanism against the bias of a charged spring by attraction to said permanent magnet, said accessory coil being arranged for counteracting said permanent magnet to allow said plunger to interact with said operating mechanism when a current signal is applied to said accessory coil;
an accessory circuit including positive and negative voltage rails and connected with said accessory coil for controlling said current signal to said accessory coil, said accessory circuit including a storage capacitor receiving current signal from first and second charging circuits and supplying said current to said accessory coil, said accessory circuit further signal including a first transistor switch for initiating said current signal to said accessory coil; and
ground fault terminal means connected with said accessory circuit and said accessory coil, said ground fault terminal means being arranged for receiving a ground fault signal to operate said first transistor switch to thereby actuate said accessory coil; and
a shunt trip terminal means connected with said accessory circuit and said accessory coil, said shunt trip terminal means being arranged for receiving a shunt trip signal to operate said first transistor switch and thereby actuate said accessory coil.

35. The circuit interrupter of claim 34 wherein said first transistor switch connects between said first charging circuit and one of said positive and negative rails.

36. The circuit interrupter of claim 34 wherein said first charging circuit includes a FET.

37. The circuit interrupter of claim 34 wherein said FET connects between said positive rail and one side of said accessory coil.

38. The circuit interrupter of claim 34 wherein said second charging circuit includes a linear resistor.

39. The circuit interrupter of claim 34 including comparator means having an output connected to the base of said first transistor switch and one input connected with said ground fault terminal means.

40. The circuit interrupter of claim 34 wherein said comparator means includes a second input connected between a first pair of resistors for providing a reference voltage to said comparator means.

41. The circuit interrupter of claim 34 wherein said linear resistor connects with a source terminal and a drain terminal on said FET.

42. The circuit interrupter of claim 34 including an electronic switch connecting with another side of said accessory coil.

43. The circuit interrupter of claim 34 wherein a silicon switch within said electronic switch connects with said storage capacitor through a zener diode.

44. The circuit interrupter of claim 34 wherein said electronic switch includes a pair of second and third transistor switches wherein a collector on said second transistor switch connects with a base on said third transistor switch.

45. The circuit interrupter of 34 claim including a timing capacitor connected with a gate and a drain terminal on said FET through corresponding current limiting resistors and connected in common with said storage capacitor.

46. The circuit interrupter of claim 34 including a fourth transistor switch having an emitter connected with said storage capacitor and a collector connected with said gate terminal to said FET.

47. The circuit interrupter of claim 34 wherein said first charging circuit charges at a faster rate than said second charging circuit.

48. The circuit interrupter of claim 34 including a second zener diode connected across said timing capacitor through second current limiting resistor.

49. The circuit interrupter of claim 34 including an opto-isolator connected between said first transistor switch and said shunt trip terminal means.

50. The circuit interrupter of claim 40 wherein said shunt trip terminals means includes a bridge rectifier and a current limiting resistor.

51. The circuit interrupter of claim 41 wherein an LED in said opto-isolator connects with an output from said bridge rectifier and a photo transistor within said opto-isolator connects with a base on said first transistor switch.

* * * * *